E. A. BENSON.
POULTRY FOUNTAIN.
APPLICATION FILED SEPT. 6, 1910.
1,035,817.
Patented Aug. 13, 1912.
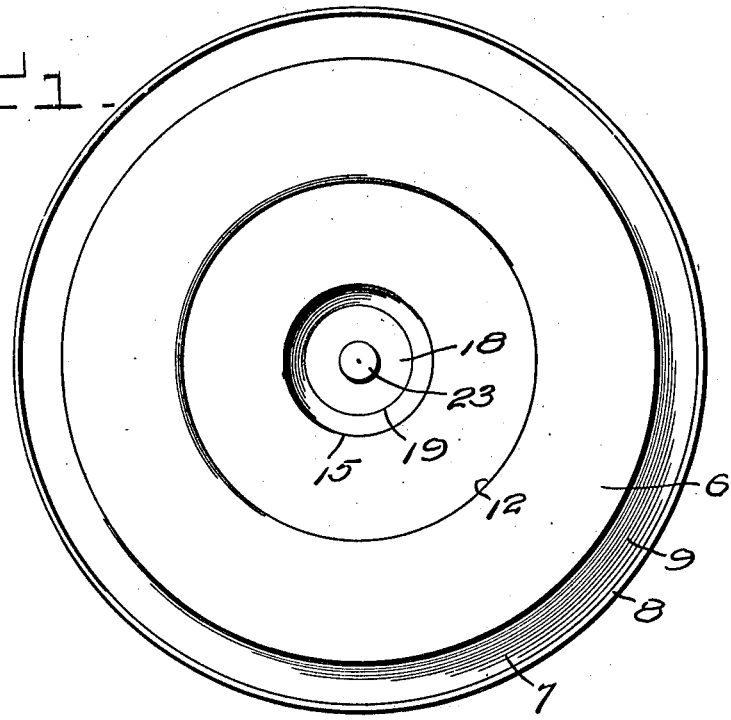
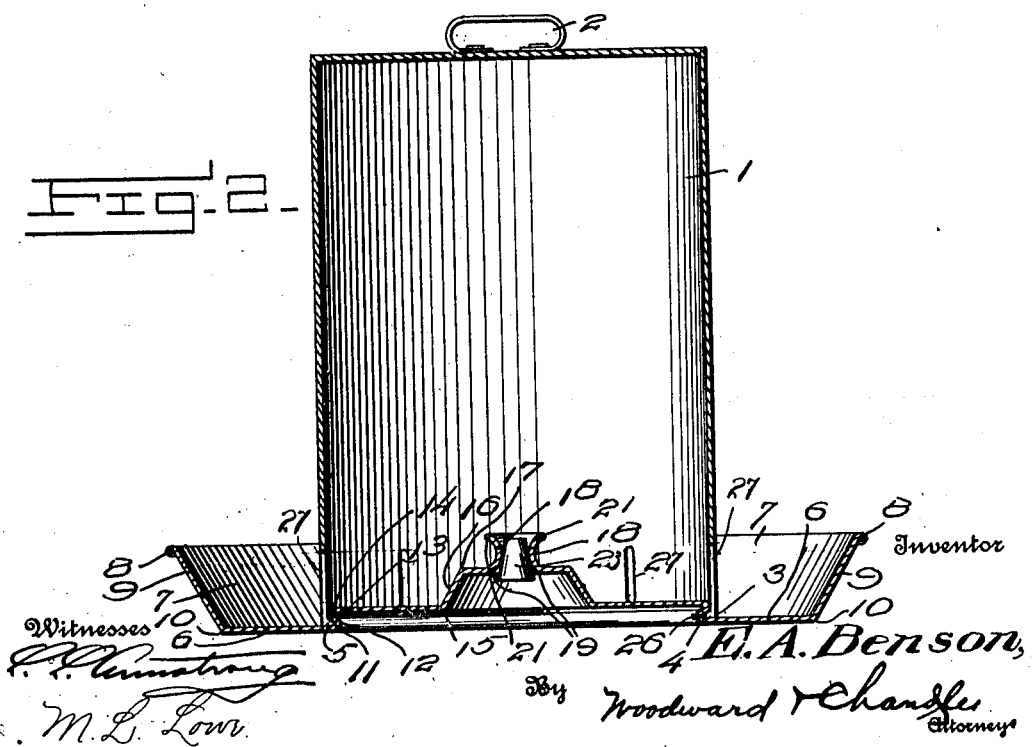

UNITED STATES PATENT OFFICE.

ELMER A. BENSON, OF PERU, ILLINOIS.

POULTRY-FOUNTAIN.

1,035,817.  Specification of Letters Patent.  Patented Aug. 13, 1912.

Application filed September 6, 1910. Serial No. 580,474.

*To all whom it may concern:*

Be it known that I, ELMER A. BENSON, a citizen of the United States, residing at Peru, in the county of Lasalle and State of Illinois, have invented certain new and useful Improvements in Poultry-Fountains, of which the following is a specification:

This invention relates to steading and feeding, and more particularly to poultry fountains.

An object of this invention is to provide a drinking fountain of extremely simple and novel construction.

Another object of this invention is to devise an article of this character which may be made of thin light metal, such as tin, and will be both cheap and durable.

A further object is to provide a poultry fountain consisting of only two parts, namely, the tank, and the trough having a filling opening therein, and a plug or stopper for the filling opening.

A still further object is to provide a poultry fountain of the above stated character which will be provided with water feeding openings in the lower part of the tank through which the water is automatically fed into the trough, and in which the two parts are readily assembled or disassembled, and in which there is no danger of the small fowls being drowned in the trough.

In the drawings: Figure 1 is a bottom plan view of my improved poultry fountain. Fig. 2 is a vertical sectional view of the same.

Referring to the drawings: 1 represents a cylindrical tank provided with a handle 2 upon its top, and having its bottom edge 3 directed inwardly so as to form a shoulder 4 and a broad flat portion 5 adapted to rest upon the bottom 6 of the trough 7.

The trough 7 has a rim 8 from which the sides 9 slope downwardly and inwardly and join the lower flat circular bottom 6, as shown at 10. At the point 11, the flat bottom 6, is turned upwardly and inwardly, forming the rounded portion 12, then outwardly to the point 13. At this point it is given another turn, in first an upwardly direction then an inwardly direction forming the retaining shoulder 14. The bottom is then continued in a horizontal direction to the point 15 near the center of the trough. From the point 15 the trough is slanted in an inward and upward direction, as at 16 to the point 17. At this point it is again directed toward the center as at 18 to the point 19. From this last point it is flared outwardly as at 20, ending at the point 21, the center being cut away forming the opening 22, through which the fountain may be filled.

A stopper 23 formed of rubber, cork or other suitable material is adapted to be forced into the opening 22 and held by the semicircular curved portion 20 to prevent the liquid from flowing out of the opening 22 or filling opening when the fountain is in its proper position for watering the fowls.

The tank 1 is provided near the bottom thereof with water feeding openings 27 in the form of slot-apertures which extend through the shoulder 4 and portion 5 of the tank to split the same into yielding segments, the liquid flowing from the tank 1 into the trough 7 through said apertures. As the upper ends of the slots 27 are on a plane with the water line, the water within the trough is constantly on a level therewith and all danger of the trough overflowing is eliminated.

When it is desired to fill the fountain, the device is inverted and the stopper 23 is removed and the water or other liquid is poured in the tank through the opening 22, the stopper 23 is replaced, and the device is returned to its former position, after which it may be grasped and carried by the handle 2.

As will be readily seen, the shoulder 4 of the tank 1 fits snugly in the channel 26 of the trough formed by the rounded portion 12 of the said trough, and the shoulder 14 rests upon the upper edge of the shoulder 4, when the parts are assembled.

Should it become necessary to clean the interior of the fountain, it is only necessary to pry the trough off of the tank. After the parts have been thoroughly cleaned, they may be readily assembled in the following manner. The stopper 23 is removed in order to allow the center part of the trough to more readily yield, the shoulder 14 is forced past the shoulder 4 of the tank, until the shoulder 4 slides into the channel 26, and the shoulder 14 assumes the position shown in Fig. 2, and the flat portion 5 of the tank rests upon the flat bottom 6 of the trough.

From the foregoing description it will be readily seen that I have provided a poultry fountain which is extremely simple, may be cheaply manufactured and may be readily dissembled for cleaning, for packing in a small space or for shipping purposes, and which may be readily assembled for use.

It will be apparent that changes in the form, proportion, and minor details of construction may be resorted to without departing from the spirit or sacrificing any of the advantages of this invention.

What is claimed is:

A poultry drinking fountain, comprising a pan having an upstanding outer peripheral flange, and having a central inwardly bossed portion formed with a flaring rim, and a tank having its open end formed with an inwardly projecting flange which can be snapped over the rim of the boss to securely lock the tank to the pan, said tank having slot apertures formed therein near said open end and extending through the flange thereof, whereby said slot apertures will permit of the springing apart of the segments of the end of the tank formed thereby to facilitate the ready forcing of the end of the tank over the boss, and also provide outlet apertures for the fluid contained within the tank, the length of said slot apertures being less than the height of the outer flange of the pan.

In testimony whereof I affix my signature, in the presence of two witnesses.

ELMER A. BENSON.

Witnesses:
 MADELINE PIERSON,
 CARL F. WACKER.

Copies of this patent may be obtained for five cents each, by addressing the "Commissioner of Patents, Washington, D. C."